United States Patent Office 3,405,136
Patented Oct. 8, 1968

3,405,136
1 - PHENYLSULFONYL - 2 - BENZIMIDAZO-
LINONES AND 1 - PHENYLSULFONYL - 2 -
BENZIMIDAZOLINETHIONES
John B. Wright, Kalamazoo, Mich., assignor to The
Upjohn Company, Kalamazoo, Mich., a corpora-
tion of Michigan
No Drawing. Filed Sept. 15, 1964, Ser. No. 396,722
20 Claims. (Cl. 260—309.2)

ABSTRACT OF THE DISCLOSURE

Certain new 1 - phenylsulfonyl-2-benzimidaxolinones and 1-phensulfonyl-2-benzimidazolinethiones, active as diuretics, tranquilizers, and against parasitic protozoa, are prepared by reacting an N-phenylsulfonyl-2-amino-aniline with phosgene, thiophosgene, or carbondisulfide. The benzimidazole benzene ring may be unsubstituted or substituted with 1 to 2 lower alkyl groups, lower alkoxy groups, or halogen atoms. The benzene ring of the benzenesulfonyl group may be substituted with a lower alkyl group or a halogen atom.

---

This invention pertains to novel organic compounds and a novel process for preparing the same. The invention is more particularly directed to novel 1-phenylsulfon-yl-2-benzimidazolinones and 1-phenylsulfonyl-2-benzim-idazolinethiones, and to the novel process which comprises reacting an N-phenylsulfonyl-2-aminoaniline and a member selected from the group consisting of phosgene, thiophosgene, and carbon disulfide.

The novel 1-phenylsulfonyl-2-benzimidazolinones and 1-phenylsulfonyl-2-benzimidazolinethiones of the invention have the structural formula:

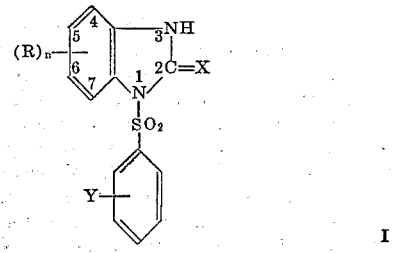

wherein R is a member selected from the group consisting of lower-alkyl, lower-alkoxy, and halogen; $n$ is a whole number from 0 to 2, inclusive; X is a member selected from the group consisting of oxygen and sulfur; and Y is a member selected from the group consisting of hydrogen, lower-alkyl, and halogen.

Examples of lower-alkyl are methyl, ethyl, propyl, and butyl, including isomeric forms thereof. Examples of lower-alkoxy are methoxy, ethoxy, propoxy, and butoxy, including isomeric forms thereof. "Halogen" is inclusive of fluorine, chlorine, bromine, and iodine.

The novel compounds of the invention according to Formula I wherein X is oxygen are prepared in accordance with the process of the invention by reacting with phosgene an N-phenylsulfonyl-2-aminoaniline of the formula:

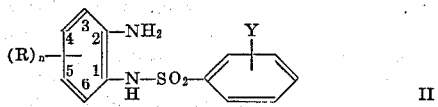

wherein R, $n$, and Y are as previously defined.

The N-phenylsulfonyl-2-aminoaniline (compound of Formula II) and phosgene are reacted in an aqueous reaction medium, advantageously in the presence of a mineral acid and an inert organic solvent. Loss of the phosgene reactant should be prevented. Conveniently, the N-phenylsulfonyl-2-aminoaniline is dissolved in an aqueous reaction medium containing a mineral acid, for example, hydrochloric acid, hydrobromic acid, sulfuric acid, and the like. A moderately polar inert organic solvent such as dioxane, tetrahydrofuran, and the like, is included in amounts ranging from about 10% to about 90%. The phosgene is conveniently introduced as a gas into the aqueous reaction medium, for example, until the solution is saturated. The reaction can be carried out at temperatures cooler than about 25° C. in order to retard loss of phosgene while the reaction proceeds. On the other hand, a phosgene saturated reaction mixture can be heated in an autoclave up to temperatures as high as about 150° C. if desired. In either event, the desired 1-phenylsulfonyl-benzimidazolinone product (compounds according to Formula I wherein X is oxygen) is recovered and purified by conventional methods such as filtration, washing, and recrystallization.

The novel compounds of the invention according to Formula I wherein X is sulfur can be prepared by using thiophosgene instead of phosgene in the above-described procedure.

Preferably, the novel compounds of the invention according to Formula I wherein X is sulfur are prepared in accordance with the process of the invention by reacting an N-phenylsulfonyl-2-aminoaniline of Formula II with carbon disulfide. Advantageously, the N-phenylsulfonyl-2-aminoaniline and carbon disulfide are reacted in an inert organic solvent in the presence of an alkali metal hydroxide and a small proportion of water. Suitable inert organic solvent include methanol, ethanol, isopropyl alcohol, dioxane, and tetrahydrofuran. Sodium hydroxide and potassium hydroxide are preferred alkali metal hydroxides. The N - phenyl - sulfonyl-2-aminoaniline, the alkali metal hydroxide, and the carbon disulfide are preferably employed in equimolar amounts, although a slight excess of a reactant may be used if desired. The reaction proceeds slowly at room temperatures, and the reaction mixture is preferably heated to a temperature of about 45° C. to about 150° C., care being taken to prevent loss of the carbon disulfide. The desired 1-phenylsulfonyl-2-benzimidazolinethione product (compounds according to Formula I wherein X is sulfur) are recovered and purified by conventional methods such as filtration, washing, and recrystallization.

The N-phenylsulfonyl-2-aminoaniline starting compounds according to Formula II are readily prepared by methods known in the art. For example, Riesz et al., Monatsh. 58, 147–169 (1931) prepared N-p-tolylsulfonyl-o-phenylenediamine by reacting o-phenylenediamine with p-toluenesulfonyl chloride in the presence of sodium acetate. A more recent publication by Billman et al., Anal. Chem. 32, 1342–1344 (1960) describes two methods for making the same N-p-tolylsulfonyl-o-phenylenediamine. In general, the N-phenylsulfonyl-2-aminoanilines of Formula II are prepared by reacting an o-nitroaniline of the formula:

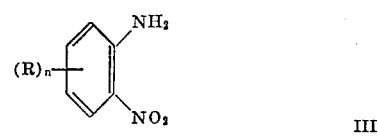

wherein R and $n$ are as previously defined, with a phenylsulfonyl chloride of the formula:

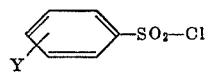

wherein Y is as previously defined, to produce an N-phenylsulfonyl-2-nitroaniline of the formula:

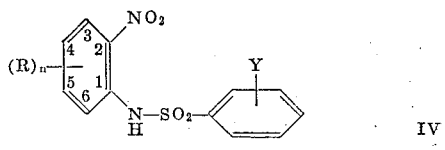

wherein R, n, and Y are as previously defined. The corresponding N-phenylsulfonyl-2-aminoanilines of Formula II are obtained by reduction of the 2-nitro group by any of the conventional methods for reducing nitro groups to amino groups, for example, by catalytic hydrogenation in the presence of a noble metal catalyst, for example, palladium-on-charcoal, or by chemical methods such as iron and acetic acid.

The novel compounds of this invention are pharmacologically useful as diuretics and tranquilizers, and they are active against protozoa, for example, *Eimeria tenella*. Hence, the new compounds can be used to produce diuresis in mammals, birds, and other animals; and to effect sedation of mammals, birds, and other animals. The compounds can also be used to control parasitic protozoa in mammals and birds, e.g., coccidia in poultry.

The novel compounds of Formula I are also useful as intermediates. Illustratively, they can be reacted with chlorine to produce active-chlorine compounds in which the N-attached hydrogen atom at the 3-position is replaced by chlorine. The active-chlorine compounds thus obtained are useful as disinfectants, bleaching agents, and antiseptics.

The following examples describe some preferred forms and practices of this invention, but they are not to be construed as limiting the scope thereof.

Preparation 1.—N-p-tolylsulfonyl-o-phenylenediamine

A mixture consisting of 14.6 g. (0.05 mole) of N-p-tolylsulfonyl-o-nitroaniline (Bell et al., J. Chem. Soc. 1927, pp. 1127–1133) and 300 ml. of 5% aqueous sodium hydroxide was hydrogenated with hydrogen at 3 atmospheres pressure in the presence of 1 g. of 10% palladium-on-charcoal catalyst. After a theoretical amount of hydrogen had been absorbed the catalyst was removed from the reaction mixture by filtration. The filter cake was washed with 5% aqueous sodium hydroxide and the washings were added to the filtrate. The combined filtrate and washings were acidified with glacial acetic acid and the precipitate that formed was recovered on a filter. After dissolving the filter cake in benzene and refrigerating the solution in order to effect crystallization, there was obtained N-p-tolylsulfonyl-o-phenylenediamine as tan needles melting at 141° to 142° C.

*Analysis.*—Calcd. for $C_{13}H_{14}N_2O_2S$: C, 59.52; H, 5.38; N, 10.68; S, 12.22. Found: C, 59.68; H, 5.00; N, 10.32; S, 12.23.

Preparation 2.—N-p-tolylsulfonyl-4-methyl-2-nitroaniline

A solution consisting of 95.3 g. (0.5 mole) of p-toluenesulfonyl chloride and 76.1 g. (0.5 mole) of 4-methyl-2-nitroaniline in 200 ml. of pyridine was heated at the reflux temperature for 1 hr. The pyridine was evaporated from the reaction mixture at 50° C. and reduced pressure. The residue thus obtained was diluted with water and a precipitate that formed was recovered on a filter. The filter cake was recrystallized from isopropyl alcohol to give 142.9 g. (93% yield) of N-p-tolylsulfonyl-4-methyl-2-nitroaniline as yellow rosettes melting at 100° to 101° C.

*Analysis.*—Calcd. for $C_{14}H_{14}N_2O_4S$: C, 54.89; H, 4.61; S, 10.47. Found: C, 55.06; H, 4.62; S, 10.60.

Following the same procedure, but substituting benzenesulfonyl chloride and p-bromobenzenesulfonyl chloride for p-toluenesulfonyl chloride, there were prepared N-benzenesulfonyl - 4 - methyl - 2 - nitroaniline and N-p-bromobenzenesulfonyl-4-methyl-2-nitroaniline, respectively.

Preparation 3.—N-p-tolylsulfonyl-2-amino-4-methylaniline

Following the procedure of Preparation 1 but substituting 15.3 g. (0.05 mole) of N-p-tolylsulfonyl-4-methyl-2-nitroaniline for N-p-tolylsulfonyl-o-nitroaniline, and recrystallizing from 90% ethanol after decolorization with activated charcoal, there was obtained N-p-tolylsulfonyl-2-amino-4-methylaniline as yellow needles melting at 135° to 137° C.

*Analysis.*—Calcd. for $C_{14}H_{16}N_2O_2S$: C, 60.85; H, 5.84; N, 10.14; S, 11.60. Found: C, 60.56; H, 5.88; N, 9.86; S, 11.26.

Following the same procedure, but substituting N-benzene-sulfonyl-4-methyl-2-nitroaniline and N-p-bromobenzenesulfonyl-4-methyl-2-nitroaniline for N-p-tolylsulfonyl-4-methyl-2-nitroaniline, there were prepared N-benzenesulfonyl-2-amino-4-methylaniline and N-p-bromobenzenesulfonyl-2-amino-4-methylaniline, respectively.

Preparation 4.—N-p-tolylsulfonyl-4-chloro-2-nitroaniline

A solution consisting of 95.3 g. (0.5 mole) of p-toluenesulfonyl chloride, 86.3 g. (0.5 mole) of 4-chloro-2-nitroaniline and 200 ml. of pyridine was heated at the reflux temperature for 1 hr. After removing the pyridine by evaporation at 50° C. and reduced pressure, the residuum was diluted with water and a precipitate that formed was recovered on a filter. The filter cake was dissolved in isopropyl alcohol and chilled to effect crystallization. There was thus obtained 130 g. (81% yield) of N-p-tolylsulfonyl-4-chloro-nitroaniline as yellow needles melting at 107.5° to 109° C.

*Analysis.*—Calcd. for $C_{13}H_{11}ClN_2O_4S$: C, 47.78; H, 3.39; Cl, 10.85; S, 9.81. Found: C, 47.79; H, 3.17; Cl, 10.55; S, 10.10.

Preparation 5.—N-p-tolylsulfonyl-2-amino-4-chloroaniline

A solution consisting of 16.3 g. (0.05 mole) of N-p-tolylsulfonyl-4-chloro-2-nitroaniline in 300 ml. of 1.5 N aqueous ammonium hydroxide was hydrogenated with hydrogen at 50 pounds pressure in the presence of 10% palladium-on-charcoal catalyst. After the theoretical amount of hydrogen had been adsorbed the catalyst was removed from the reaction mixture by filtration and the filtrate was acidified with glacial acetic acid. A precipitate that formed was recovered on a filter. The filter cake was dissolved in benzene and chilled to effect crystallization. There was thus obtained N-p-tolylsulfonyl-2-amino-4-chloro-aniline as tan needles having a melting point of 129.5° to 131° C.

*Ananlysis.*—Calcd. for $C_{13}H_{13}ClN_2O_2S$: C, 52.61; H, 4.42; Cl, 11.95; N, 9.44; S, 10.80. Found: C, 53.05; H, 4.53; Cl, 11.56; N, 9.21; S, 10.80.

Preparation 6

Following the procedure of Preparation 2 but substituting 2-nitro - 5-propoxyaniline, 4-ethyl-2-nitroaniline, 4,5-diethyl-2-nitroaniline, 2,4-diisopropyl-6-nitroaniline, 5-tert-butyl-2-nitroaniline, 2-chloro-6-nitroaniline, 4,5-dichloro-2-nitroaniline, 3-bromo-2-nitroaniline, 5-fluoro-2-nitroaniline, 2-iodo-6-nitroaniline, 2-nitro-3,4-xylidine, 6-nitro-o-anisidine, 5-chloro-2-nitro-p-anisidine, 2-nitro-p-phenetidine, and 4-methyl-6-nitro-m-phenetidine for 4 methyl-2-nitroaniline, there were prepared N-p-tolylsulfonyl - 2-nitro - 5-propoxyaniline, N-p-tolylsulfonyl-4-ethyl-2-nitroaniline, N-p-tolylsulfonyl-4,5-diethyl-2-nitroaniline, N-p-tolylsulfonyl-2,4-diisopropyl - 6-nitroaniline, N-p-tolylsulfonyl-tert-butyl - 2-nitroaniline, N-p-tolylsulfonyl-2-chloro - 6-nitroaniline, N-p-tolylsulfonyl - 4,5-dichloro-2-nitroaniline, N-p-tolylsulfonyl-3-bromo 2-nitroaniline, N-p-tolylsulfonyl-5-fluoro - 2 - nitroaniline, N-p-tolylsulfonyl-2-iodo - 6-nitroaniline, N-p-tolylsulfonyl-2-nitro-3,4-xylidine, N-p-tolylsulfonyl - 6-nitro-o-anisidine, N-p-tolylsulfonyl - 5-chloro - 2-nitro-p-anisidine, N-p-tolylsulfonyl - 4-ethyl - 2-nitroaniline, N-p-tolylsulfonyl-4-methyl-6-nitro-m-phenetidine, respectively.

Preparation 7

Following the procedure of Preparation 5 but substituting N-p-tolylsulfonyl-2-nitro-5-propoxyaniline, N-p-tolylsulfonyl - 4-ethyl - 2-nitroaniline, N-p-tolylsulfonyl-4,5-diethyl-2 - nitro-aniline, N-p-tolylsulfonyl - 2,4-diisopropyl-6 - nitroaniline, N-p-tolylsulfonyl - 5-tert-butyl-2-nitroaniline, N-p-tolylsulfonyl-2 - chloro-6-nitroaniline, N-p-tolylsulfonyl-4,5 - dichloro - 2 - nitroaniline, N-p-tolylsulfonyl-3-bromo - 2-nitroaniline, N-p-tolylsulfonyl-5-fluoro-2-nitroaniline, N-p-tolylsulfonyl-2-iodo - 6-nitroaniline, N-p-tolylsulfonyl - 2-nitro-3,4 - xylidine, N-p-tolylsulfonyl - 6 - nitro-o-anisidine, N-p-tolylsulfonyl-5-chloro - 2-nitro-p-anisidine, N-p-tolylsulfonyl - 2-nitro-p-phenetidine, and N-p-tolylslfonyl - 4-methyl - 6-nitro-m-phenetidine for N-p-tolylsulfonyl-4-chloro-2-nitroaniline, there were prepared N-p-tolylsulfonyl - 2 - amino - 5-propoxyaniline, N-p-tolylsulfonyl - 2 - amino - 4-ethylaniline, N-p-tolylsulfonyl - 2-amino - 4,5-diethylaniline, N-p-tolylsulfonyl - 2-amino - 4,6-diisopropylaniline, N-p-tolylsulfonyl-2-amino - 5-tert - butylaniline, N-p-tolylsulfonyl - 2-amino - 6-chloroaniline, N-p-tolylsulfonyl - 2-amino-4,5-dichloroaniline, N-p-tolylsulfonyl - 2-amino-3-bromoaniline, N-p-tolylsulfonyl - 2-amino - 5 - fluoroaniline, N-p-tolylsulfonyl - 2-amino - 6-iodoaniline, N-p-tolylsulfonyl - 2-amino-3,4-xylidine, N-p-tolylsulfonyl-6-amino-o-anisidine, N-p-tolylsulfonyl - 2-amino - 5-chloro-p-anisidine, N-p-tolylsulfonyl - 2-amino-p-phenetidine, and N-p-tolylsulfonyl-6-amino - 4-methyl-m-phenetidine, respectively.

Example 1.—Preparation of 1-p-tolylsulfonyl-2-benzimidazolinone

A solution consisting of 3.94 g. (0.015 mole) of N-p-tolylsulfonyl-o-phenylenediamine, 15 ml. of 1 N hydrochloric acid, 50 ml. of water, and 30 ml. of dioxane was cooled to 10° C. and saturated with phosgene. The reaction mixture was filtered, and the filter cake was washed with water. After recrystallizing from ethanol, there was thus obtained 2.5 g. (59% yield) of 1-p-tolylsulfonyl-2-benzimidazolinone as red-tan prisms melting at 211° to 215° C.

Analysis.—Calcd. for $C_{14}H_{12}N_2O_3S$: C, 58.32; H, 4.20; N, 9.72; S, 11.12. Found: C, 58.32; H, 4.07; N, 9.67; S, 11.11.

Example 2.—Preparation of 1-p-tolylsulfonyl-5-methyl-2-benzimidazolinone

Following the procedure of Example 1, but substituting N-p-tolylsulfonyl - 2-amino - 4-methylaniline for N-p-tolylsulfonyl-o-phenylenediamine, there was obtained 1-p-tolylsulfonyl-5-methyl-2-benzimidazolinone as pink needles having a melting point of 263° to 265° C.

Analysis.—Calcd. for $C_{15}H_{14}N_2O_3S$: C, 59.59; H, 4.67; N, 9.27. Found: C, 59.38; H, 4.34; N, 9.27.

Example 3.—Preparation of 1-p-tolylsulfonyl-5-chloro-2-benzimidazolinone

Following the procedure of Example 1, but substituting N-p-tolylsulfonyl-2-amino - 4-chloroaniline for N-p-tolylsulfonyl-o-phenylenediamine, there was prepared 1-p-tolylsulfonyl-5-chloro - 2-benzimidazolinone as yellow prisms melting at 252° to 253° C.

Analysis.—Calcd. for $C_{14}H_{11}ClN_2O_3S$: C, 52.10; H, 3.44; Cl, 10.98; N, 8.68; S, 9.93. Found C, 52.35; H, 3.21; Cl, 10.53; N, 8.43; S, 9.74.

Example 4.—Preparation of 1-p-tolylsulfonyl-2-benzimidazolinethione

A mixture consisting of 4.33 g. (0.0165 mole) of N-p-tolylsulfonyl-o-phenylenediamine (Preparation 1), 0.93 g. (0.0165 mole) of potassium hydroxide, 1.3 g. (0.017 mole) of carbon disulfide, 20 ml. of ethanol, and 2.25 ml. of water was heated at the reflux temperature for 3 hrs. The reaction mixture was diluted with 20 ml. of water and acidified with glacial acetic acid. A solid that separated was recovered on a filter and washed with water. After recrystallizing the solid from ethanol, there was obtained 1-p-tolylsulfonyl-2-benzimidazolinethione as light tan needles melting at 153° C.

Analysis.—Calcd. for $C_{14}H_{12}N_2O_2S_2$: C, 55.26; H, 3.98; N, 9.21; S, 21.03. Found: C, 55.25; H, 4.04; N, 9.38; S, 21.24.

Example 5.—Preparation of 1-p-tolylsulfonyl-5-methyl-2-benzimidazolinethione

Following the procedure of Example 4, but substituting 4.5 g. (0.165 mole) of N-p-tolylsulfonyl-2-amino - 4-methylaniline (Preparation 3) for N-p-tolylsulfonyl-o-phenylenediamine, there was prepared 3.20 g. (62% yield) of 1-p-tolylsulfonyl-5-methyl - 2-benzimidazolinethione as tan prisms melting at 148.5° to 150° C.

Analysis.—Calcd. for $C_{15}H_{14}N_2O_2S_2$: C, 56.58; H, 4.43; N, 8.80; S, 20.14. Found: C, 56.58; H, 4.75; N, 8.81; S, 19.92.

Example 6.—Preparation of 1-p-tolylsulfonyl-5-chloro-2-benzimidazolinethione

Following the procedure of Example 4, but substituting 1-p-tolylsulfonyl-2-amino-4-chloroaniline (Preparation 5) for N-p-tolylsulfonyl-o-phenylenediamine, and recrystallizing the crude product from 20% ethanol there was obtained 1 - p-tolylsulfonyl-5-chloro-2-benzimidazolinethione as tan needles melting at 142.5° to 143.5° C.

Analysis.—Calcd. for $C_{14}H_{11}ClN_2O_2S_2$: N, 8.29; S, 18.92. Found: N, 7.98; S, 18.88.

Example 7

Following the procedure of Example 1, but substituting N - benzenesulfonyl-2-amino-4-methylaniline, N-p-bromobenzene - sulfonyl - 2-amino-4-methylaniline, N-p-tolylsulfonyl - 2 - amino - 5 - propoxyaniline, N-p-tolylsulfonyl-2-amino - 4 - ethylaniline, N-p-tolylsulfonyl-2-amino-4,5-diethylaniline, N-p-tolylsulfonyl-2-amino-4,6-diisopropylaniline, N - p-tolylsulfonyl-2-amino-5-tert-butylaniline, N-p-tolylsulfonyl-2-amino-6-chloroamiline, N-p-tolylsulfonyl-2-amino-4,5-dichloroaniline, N-p-tolylsulfonyl-2-amino-3-bromoaniline, N-p-tolylsulfonyl2amino-5-fluoroaniline, N-p-tolylsulfonyl-2-amino-6-iodoaniline, N-p-tolylsulfonyl-2-amino-3,4-xylidine, N-p-tolylsulfonyl-6-amino-o-anisidine, N-p-tolylsulfonyl-2-amino-5-chloro-p-anisidine, N-p-tolylsulfonyl-2-amino-p-phenetidine, and N-p-tolylsulfonyl-6-amino - 4 - methyl-m-phenetidine for N-p-tolylsulfonyl-o-phenylenediamine, there were prepared 1-benzenesulfonyl-5 - methyl - 2 - benzimidazolinone, 1-p-bromobenzenesulfonyl - 5-methyl-2-benzimidazolinone, 1-p-tolylsulfonyl-6-propoxy-2-benzimidazolinone, 1-p-tolylsulfonyl-5-ethyl-2-benzimidazolinone, 1 - p-tolylsulfonyl-5,6-diethyl-2-benzimidazolinone, 1-p-tolylsulfonyl-5,7-diisopropyl-2-benzimidazolinone, 1-p-tolylsulfonyl-6-tert-butyl-2-benzimidazolinone, 1-p-tolylsulfonyl-7-chloro-2-benzimidazolinone, 1-p - tolylsulfonyl - 5,6 - dichloro-2-benzimidazolinone, 1-p-tolylsulfonyl - 4 - bromo - 2 - benzimidazolinone, 1-p-tolylsulfonyl-6-fluor-o-2-benzimidazolinone, 1-p-tolylsulfonyl-7 - iodo - 2 - benzimidazolinone, 1 - p-tolylsulfonyl-4,5-dimethyl-2-benzimidazolinone, 1-p-tolylsulfonyl-7-methoxy-2 - benzimidazolinone, 1 - p - tolylsulfonyl - 6 - chloro - 5-methoxy-2-benzimidazolinone, 1-p-tolylsulfonyl-5-ethoxy-2 - benzimidazolinone, and 1 - p-tolylsulfonyl-5-methyl-6-ethoxy-2-benzimidazolinone, respectively.

Example 8

Following the procedure of Example 4, but substituting N - benzenesulfonyl-2-amino-4-methylaniline, N-p-bromobenzenesulfonyl - 2 - amino-4-methylaniline, N-p-tolylsulfonyl - 2 - amino - 5 - propoxyaniline, N-p-tolylsulfonyl-2- amino-4-ethylaniline, N-p-tolylsulfonyl-2-amino-4,5-diethylaniline, N-p-tolylsulfonyl-2-amino-4,6-diisopropylaniline, N-p-tolylsulfonyl-2-amino-5-tert-butylaniline, N-p-tolylsulfonyl-2-amino-6-chloroaniline, N-p-tolylsulfonyl-2-amino-4,5-dichloroaniline, N-p-tolylsulfonyl-2-amino-3-bromoaniline, N-p-tolylsulfonyl-2-amino-5-fluoroaniline, N-p-tolylsulfonyl-2-amino-6-iodoaniline, N-p-tolylsulfonyl-2-amino-3,4-xylidine, N-p-tolylsulfonyl-6-amino-o-anisidine, N-p-tolylsulfonyl-2-amino-5-chloro-p-anisidine, N-p-tolylsulfonyl-2-amino-p-phenetidine, and N-p-tolylsulfonyl-6-amino-4-methyl-m-phenetidine for N-p-tolylsulfonyl-o-phenylenediamine, there were prepared 1-benzenesulfonyl-5-methyl-2-benzimidazolinethione, 1-p-bromobenzenesulfonyl-5-methyl-2-benzimidazolinethione, 1-p-tolylsulfonyl-6-propoxy-2-benzimidazolinethione, 1-p-tolylsulfonyl-5-ethyl-2-benzimidazolinethione, 1-p-tolylsulfonyl-5,6-diethyl-2-benzimidazolinethione, 1-p-tolylsulfonyl-5,7-diisopropyl-2-benzimidazolinethione, 1-p-tolylsulfonyl-6-tert-butyl-2-benzimidazolinethione, 1-p-tolylsulfonyl-7-chloro-2-benzimidazolinethione, 1-p-tolylsulfonyl-5,6-dichloro-2-benzimidazolinethione, 1-p-tolylsulfonyl-4-bromo-2-benzimidazolinethione, 1-p-tolylsulfonyl-6-fluoro-2-benzimidazolinethione, 1-p-tolylsulfonyl-7-iodo-2-benzimidazolinethione, 1-p-tolylsulfonyl-4,5-dimethyl-2-benzimidazolinethione, 1-p-tolylsulfonyl-7-methoxy-2-benzimidazolinethione, 1-p-tolylsulfonyl-6-chloro-5-methoxy-2-benzimidazolinethione, 1-p-tolylsulfonyl-5-ethoxy-2-benzimidazolinethione, and 1-p-tolylsulfonyl-5-methyl-6-ethoxy-2-benzimidazolinethione, respectively.

I claim:
1. Compounds of the formula

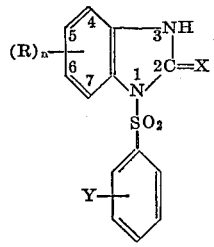

wherein R is a member selected from the group consisting of lower-alkyl, lower-alkoxy, and halogen; n is a whole number from 0 to 2, inclusive; X is a member selected from the group consisting of oxygen and sulfur; and Y is a member selected from the group consisting of hydrogen, lower-alkyl, and halogen.
2. 1-p-tolylsulfonyl-5-lower-alkyl-2-benzimidazolinone.
3. 1-p-tolylsulfonyl-5-methyl-2-benzimidazolinone.
4. 1-p-tolylsulfonyl-5-halo-2-benzimidazoline.
5. 1-p-tolylsulfonyl-5-chloro-2-benzimidazolinone.
6. 1-p-tolysulfonyl-2-benzimidazolinone.
7. 1-p-tolysulfonyl-2-benzimidazolinethione.
8. 1-p-tolylsulfonyl-5-lower-alkyl-2-benzimidazolinethione.
9. 1-p-tolylsulfonyl-5-methyl-2-benzimidazolinethione.
10. 1-p-tolylsulfonyl-5-halo-2-benzimidazolinethione.
11. 1-p-tolylsulfonyl-5-chloro-2-benzimidazolinethione.
12. The process which comprises reacting, in the presence of a mineral acid, an N-phenylsulfonyl-2-aminoaniline of the formula

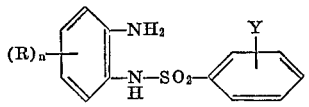

wherein R is a member selected from the group consisting of lower-alkyl, lower-alkoxy, and halogen; n is a whole number from 0 to 2, inclusive; and Y is a member selected from the group consisting of hydrogen, lower-alkyl, and halogen with a member selected from the group consisting of phosgene and thiophosgene to produce a compound of the formula

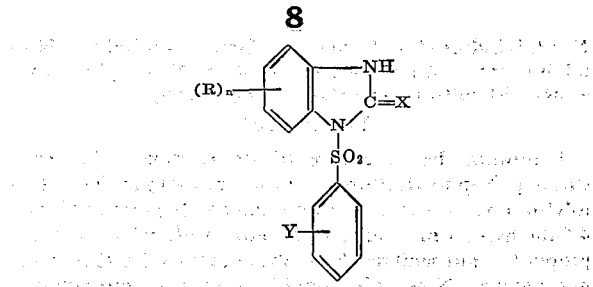

wherein R, n, and Y are as defined above and X is a member selected from the group consisting of oxygen and sulfur.
13. The process according to claim 12 which comprises reacting N-p-tolylsulfonyl-o-phenylenediamine and phosgene to produce 1-p-tolylsulfonyl-2-benzimidazolinone.
14. The process according to claim 12 which comprises reacting N-p-tolylsulfonyl-2-amino-4-chloraniline with phosgene to produce 1-p-tolylsulfonyl-5-chloro-2-benzimidazolinone.
15. The process according to claim 12, which comprises reacting N-p-tolylsulfonyl-2-amino-4-methylaniline with phosgene to produce 1-p-tolylsulfonyl-5-methyl-2-benzimidazolinone.
16. The process which comprises reacting, in the presence of a mineral acid, an N-phenylsulfonyl-2-aminoaniline of the formula

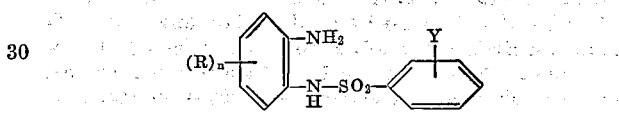

wherein R is a member selected from the group consisting of lower-alkyl, lower-alkoxy, and halogen; n is a whole number from 0 to 2, inclusive; and Y is a member selected from the group consisting of hydrogen, lower-alkyl, and halogen with phosgene to produce a compound of the formula

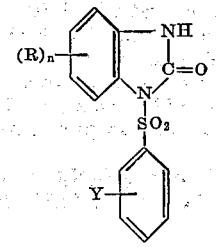

wherein R, n, and Y are as defined above.
17. The process which comprises reacting, in the presence of an alkali metal hydroxide, an N-phenylsulfonyl-2-aminoaniline of the formula

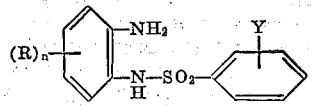

wherein R is a member selected from the group consisting of lower-alkyl, lower-alkoxy, and halogen; n is a whole number from 0 to 2, inclusive; and Y is a member selected from the group consisting of hydrogen, lower-alkyl, and halogen with carbon disulfide to produce a compound of the formula

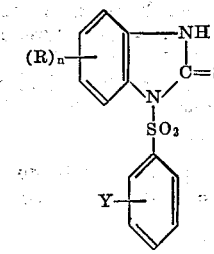

wherein R, n, and Y are as defined above.

18. The process according to claim 17 which comprises reacting N-p-tolylsulfonyl-o-phenylenediamine and carbon disulfide to produce 1-p-tolylsulfonyl-2-benzimidazolinethione.

19. The process according to claim 17 which comprises reacting N-p-tolylsulfonyl-2-amino-4-chloroaniline with carbon disulfide to produce 1-p-tolylsulfonyl-5-chloro-2-benzimidazolinethione.

20. The process according to claim 17 which comprises reacting N-p-tolylsulfonyl-2-amino-4-methylaniline with carbon disulfide to produce 1-p-tolylsulfonyl-5-methyl-2-benzimidazolinethione.

References Cited

UNITED STATES PATENTS

| | | | |
|---|---|---|---|
| 1,933,962 | 11/1933 | Bögemann et al. | 260—309.2 |
| 2,642,396 | 6/1953 | Roddy | 260—309.2 |
| 2,701,249 | 2/1955 | Koniuszy | 260—309.2 |
| 2,927,116 | 3/1960 | Davoll et al. | 260—309.2 |
| 2,933,503 | 4/1960 | Clark et al. | 260—309.2 |
| 3,207,604 | 9/1965 | Rauch | 260—309.2 |
| 3,235,559 | 2/1966 | Blöcher et al. | 260—309.2 |
| 3,246,035 | 4/1966 | Forman et al. | 260—309.2 |
| 3,056,777 | 10/1962 | Wittreich et al. | 260—309.2 |

OTHER REFERENCES

Hofmann: Imidozole and Its Derivatives, Part I, pp. 285–286, and 291, N.Y. Interscience, 1953.

Hunger et al.: Chem. Abst., vol. 56, cols. 2436-7 (1962).

Sawleuicz et al.: Roczniki Chem., vol. 38 (718) the title page and page thereafter, pp. 1073-8 (1964, printing finished August 1964).

Tyurenkova et al.: Chem. Abst., vol. 56, col. 7303 (1962).

Wright: Chem. Rev., vol. 48, pp. 472-3 (1951).

JOHN D. RANDOLPH, *Primary Examiner.*

N. TROUSOF, *Assistant Examiner.*